Dec. 22, 1936.  C. G. HALL  2,065,452
DEVICE AND METHOD FOR MAKING CONFECTION COVERS
Filed May 14, 1935
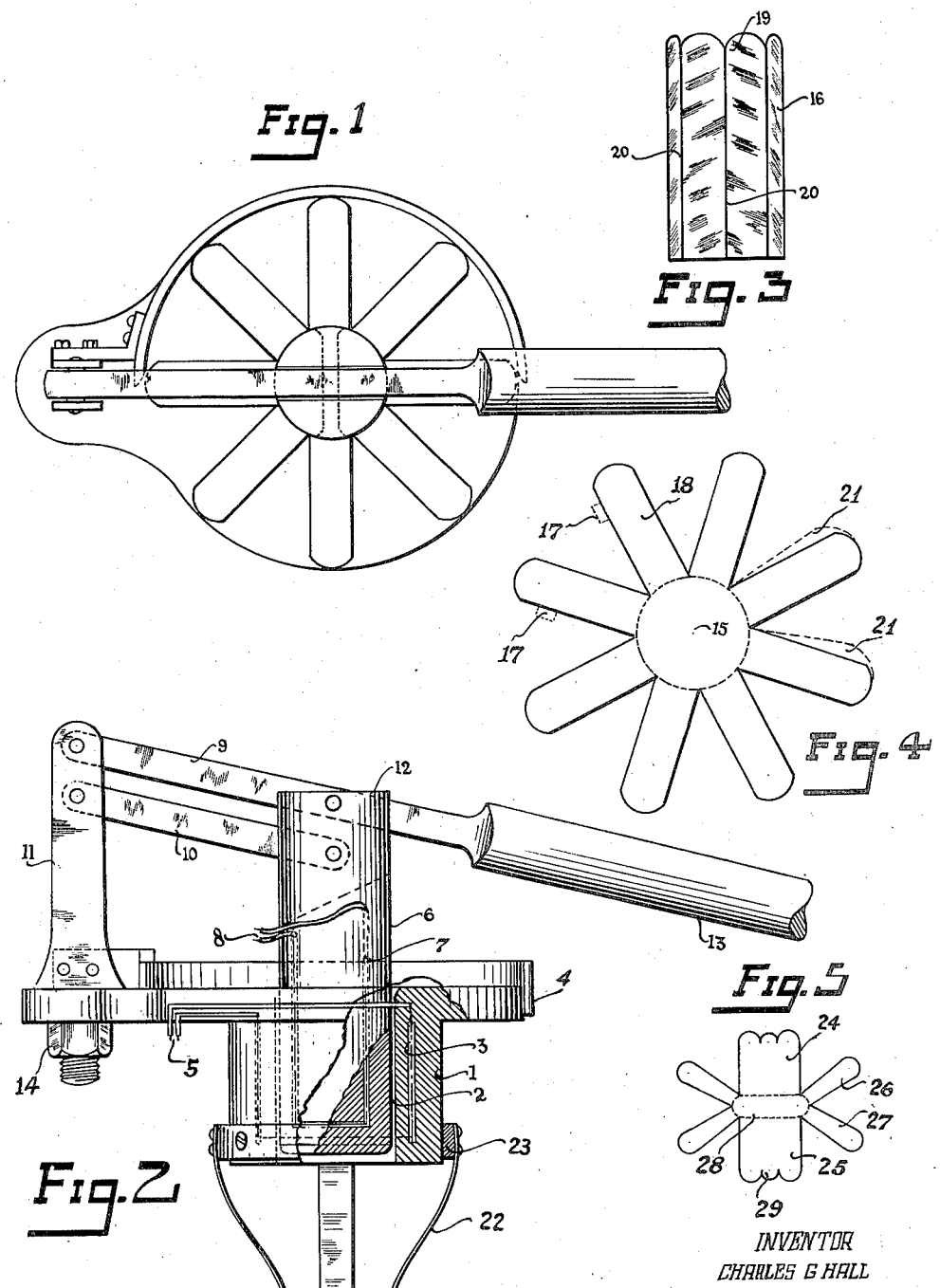
INVENTOR
CHARLES G HALL
BY
ATTORNEY Patented Dec. 22, 1936

2,065,452

UNITED STATES PATENT OFFICE 2,065,452

DEVICE AND METHOD FOR MAKING CONFECTION COVERS

Charles G. Hall, Caldwell, Idaho, assignor to Edible Bottle Company, a corporation of Idaho Application May 14, 1935, Serial No. 21,469

4 Claims. (Cl. 93—51)

The primary purpose and object of my invention is to provide a jacket and means for making the same that it may be used for encompassing the hand engaging end of an edible container during shipment and one that may be used in the handling of the same during consumption of the edible container.

A further object of my invention consists in so constructing the device that it may be used for the production of a jacket for edible containers, that will have a long and useful life and one having practical freedom from operating annoyances.

A further object of my invention consists in so forming the jacket for the edible container that it will be practically fluid tight and yet be made of relatively thin material having sealed edges at the point of contact of the meeting edges with each other.

The invention is comprised primarily of a heated body jacket member having a heated plunger that may be reciprocated into and out of relationship with the body element.

A still further object of my invention consists in so constructing the device that it will occupy a minimum of space and be relatively cheap in first cost.

With these and incidental objects in view, the invention and the method consist in certain novel features of construction and combination of parts, the essential elements of which are set forth in the appended claims, and a preferred embodiment of which is hereinafter shown with reference to the drawing which accompanies and forms a part of this specification.

In the drawing:

Fig. 1 is a plan view of the assembled device.

Fig. 2 is a side view, partially in section of the assembled device.

Fig. 3 is a side view of a finished product made by the device.

Fig. 4 is a plan view of the material that is to be formed into the finished product by the device.

Fig. 5 is a diagrammatical layout or plan view of a sheet of unfolded material, which when folded on the dotted lines will form a container for the encompassing of the hand engaging end of an edible container having an elliptical cross section.

Like reference characters refer to like parts throughout the several views.

My device is primarily comprised of a body element 1. The body element has a cylindrical opening 2 extending longitudinally thereof and a heating element 3 is disposed within the body element and about a central opening. The purpose and object of the heating element is to maintain the body element in a heated condition of the right temperature. A flanged top 4 is disposed at the upper and entrance end of the body element and is preferably formed integral therewith.

Electric current for heating the body element is supplied through electric conductors 5 that lead to a source of energy, not here shown. A plunger 6 is provided that is coaxial with the body element and moves longitudinally of the body element. The plunger 6 has a heating element 7 disposed therein that is provided for maintaining the plunger in a suitable heated condition also. The electric energy for supplying heat to the heating element 7 is provided through the conductor at 8. These electric conductors lead to a source of electric energy, not here shown.

The plunger 6 is supported by links 9 and 10. The links 9 and 10 are hingedly secured to a standard or post 11 that upwardly extends from the flanged top 4. The links are secured to the plunger 6 upon their opposite end by pins 12. A handle 13 is secured to the plunger and outwardly extends from the front thereof to facilitate the manual manipulation of the same.

While I have shown my device as being adapted for manual manipulation and use, I do not wish to be limited to the manual operation of the same as the same may be manipulated by power means, with equal facility.

The post 11 to which the links 9 and 10 are secured has a threaded stem extending through the flanged top 4. A nut 14 is threadedly secured thereto that engages the underside of the flanged top 4 and maintains the post in desired placement. By the loosening of the nut 14 the post and the handle assembly and the plunger may be rotated to place the plunger out of alignment with the center hole and the body element 1 facilitates the cleaning and the inspection of the body element assembly.

My device is primarily intended for the forming of star-shaped material, as illustrated in Fig. 4. By placing a unit of the material with the center 15 of the unit being disposed at the center of the plunger and the center of the opening disposed within the body element, the lowering of the plunger forms a jacket shown in side elevation in Fig. 3.

The purpose and object of heating the body element is to heat the material during the forming process. The finished product to be made by this device is primarily to be used upon frozen confections and the like and it is therefore desirable to so make the device that it may be used as a jacket and cover for the food product to permit the handling of the food product, by the hand of the manufacturer and by the hand of the consumer of the same without undue contamination of the outer surface of the article of food.

I have found that satisfactory results are to be obtained where the article to be formed into the jacket is coated on either side with a paraffin coating or other wax coating that solidifies at normal temperatures and that may be liquefied at temperatures above normal. In doing so the meeting edges of the star-shaped articles to be formed are temporarily liquefied and sealed together and secured together.

In the consuming of the article of food placed therein each of the component elements 16 of the jacket may be independently manipulated to expose the article of food to be consumed.

Where the article to be formed is made of extremely thin material it may be found desirable to provide tabs 17 upon one or both sides of each of the fingers 18. These tabs are illustrated in dotted position at 17 in Fig. 4 and in dotted position at 19 in Fig. 3, thereby providing facilities for the forming of a jacket that will have greater strength from relatively thin material. This can be accomplished by simply cementing the meeting edges of the fingers together as illustrated at 20 in Fig. 3.

I may also wish to increase the width of the fingers as illustrated at 21 in dotted position in Fig. 4 to permit an over-lapping of the outer extremities of the respective fingers when the device is formed. Where the same has been coated with a wax-like coating this permits the forming of a jacket of considerable strength. When heated the wax on the adjacent over-lapping surfaces cements the jacket together at each forming cycle of operation.

In the manufacturing of the product I provide flexible locking fingers 22 and secure the same to the outer periphery of the body element 1 adjacent its lower edge. To facilitate the adjustment and removal of the locking fingers 22 I have found best results are to be obtained where the same is secured to a band 23 that is adjustably positionable about the outer face of the body element 1. These fingers extend inwardly beyond the confines of the inner wall of the body element 1 so that when the jacket has been formed and finished within the body element, the same may be ejected downwardly through the bottom by the forming of the next jacket therein, the fingers locating and positioning the finished product through the continuous operation of the device. The jackets thus formed are removed automatically, or by hand from their grasp within the flexible fingers 22 as succeeding jackets are made.

In Fig. 5 I have shown a sheet of material comprised of sides 24 and 25 and having end flaps 26 and 27 that are disposed upon the oppositely disposed ends of the sheet. When this is folded on the dotted line 28 it will form a container to fit an edible confection substantially in cross section, like the dotted lines 28.

It will be noted that the confection holder then will have a fluted top edge 29 that is formed similar to the confection holder, illustrated in Fig. 3.

While the form of mechanism and the method herein shown and described is admirably adapted to fulfill the objects primarily stated, it is to be understood that it is not intended to confine the invention to the one embodiment and the one method herein shown and described, as it is susceptible of embodiment in various forms and in various methods, all coming within the scope of the claims which follow.

What I claim is:

1. In a device of the class described, the combination of a body element having a central opening disposed longitudinally of the body element, a plunger smaller in diameter than the opening disposed within the body element and reciprocably disposed relative to the opening and the body element, means for electrically heating the body element and the plunger, a post removably secured to and upwardly extending from the body element, a handle removably secured to the post and hinged to the plunger and a plurality of locking fingers secured to a band that is removably secured to the lower end of the body element.

2. A method of forming a fluid tight jacket for containers which consists in first forming the container from a single piece of wax coated star shaped material, then closing the points of the star into edge contacts with each other, then applying heat to the inside and the outside of the points simultaneously.

3. A method of forming fluid tight holders or containers which consists first in forming a star shaped unit from wax coated material, then forming the star shaped unit into the desired cup shape and finally applying heat to seal the meeting edges of the points of the star and moving the same longitudinally of the holder in which the same is formed during the application of heat thereto.

4. A method of forming jackets for edible containers which consists first in coating a sheet having been wax coated on its opposite broad surfaces, then forming a star shaped unit of the same and finally passing the star shaped unit through a press to cause the edges of the points of the star to contact each other and apply heat in sufficient intensity to cause the wax coating to fuse the meeting edges of the star points together during its passage through the forming device.

CHARLES G. HALL.